United States Patent
Perrino et al.

(10) Patent No.: US 12,338,178 B2
(45) Date of Patent: Jun. 24, 2025

(54) NOISE REDUCING MORTAR COMPOSITION

(71) Applicant: SIKA TECHNOLOGY AG, Baar (CH)

(72) Inventors: Luigi Perrino, Nago Torbole (IT);
Tiziano Rattighieri, Modena (IT);
Alberto Borghi, Campogalliano (IT);
Luz Granizo, Madrid (ES)

(73) Assignee: SIKA TECHNOLOGY AG, Baar (CH)

( * ) Notice: Subject to any disclaimer, the term of this patent is extended or adjusted under 35 U.S.C. 154(b) by 856 days.

(21) Appl. No.: 17/603,486

(22) PCT Filed: May 6, 2020

(86) PCT No.: PCT/EP2020/062562
§ 371 (c)(1),
(2) Date: Oct. 13, 2021

(87) PCT Pub. No.: WO2020/225295
PCT Pub. Date: Nov. 12, 2020

(65) Prior Publication Data
US 2022/0220034 A1  Jul. 14, 2022

(30) Foreign Application Priority Data
May 6, 2019 (EP) .................................... 19172829

(51) Int. Cl.
| | |
|---|---|
| *C04B 28/08* | (2006.01) |
| *C04B 14/06* | (2006.01) |
| *C04B 14/12* | (2006.01) |
| *C04B 28/04* | (2006.01) |
| *C04B 28/06* | (2006.01) |
| *C04B 103/00* | (2006.01) |
| *C04B 111/00* | (2006.01) |
| *C04B 111/52* | (2006.01) |

(52) U.S. Cl.
CPC .............. *C04B 28/08* (2013.01); *C04B 14/06* (2013.01); *C04B 14/12* (2013.01); *C04B 28/04* (2013.01); *C04B 28/065* (2013.01); *C04B 2103/0065* (2013.01); *C04B 2111/00646* (2013.01); *C04B 2111/52* (2013.01)

(58) Field of Classification Search
CPC ......... C04B 28/08; C04B 14/06; C04B 14/12; C04B 28/04; C04B 28/065; C04B 28/06; C04B 40/065; C04B 2103/0065; C04B 2111/00646; C04B 2111/52; C04B 2111/00672; C04B 2111/28; E04F 15/12; E04F 15/20; Y02W 30/91
See application file for complete search history.

(56) References Cited

U.S. PATENT DOCUMENTS

2009/0162602 A1   6/2009  Cottier et al.

FOREIGN PATENT DOCUMENTS

| CN | 101624276 A | | 1/2010 |
|---|---|---|---|
| CN | 102924014 A | | 2/2013 |
| CN | 104844117 A | * | 8/2015 |
| CN | 106966663 A | | 7/2017 |
| EP | 1 721 876 A1 | | 11/2006 |
| EP | 2 583 954 A1 | | 4/2013 |
| WO | 91/10026 A1 | | 7/1991 |
| WO | 2015/179738 A1 | | 11/2015 |

OTHER PUBLICATIONS

"Density of Pork", https://www.aqua-calc.com/page/density-table/substance/cork-coma-and-blank-solid, (Year: 2024).*
Aug. 13, 2020 International Search Report issued in International Patent Application No. PCT/EP2020/062562.
Qi, "Studies to Applications of Alkali-Resistant Glass Fibers in Cement Concrete Mortar," China Academic Journal Electronic Publishing House, pp. 80-85.

* cited by examiner

*Primary Examiner* — Anthony J Green
(74) *Attorney, Agent, or Firm* — Oliff PLC

(57) ABSTRACT

A mortar composition, in particular a leveling mortar composition, including: a) 10-50 wt. % of a hydraulic binder, b) 10-25 wt. % of lightweight aggregates, c) 30-50 wt. % of further aggregates which have a particle density that is higher than the particle density of the lightweight aggregates, d) 0.5-5 wt. % of a polymer.

10 Claims, No Drawings

NOISE REDUCING MORTAR COMPOSITION

TECHNICAL FIELD

The invention relates to a mortar composition, in particular a leveling mortar composition as well as to a kit-of-parts comprising a mortar composition and either mineral wool, or an adhesive composition, or both. A further object of the invention is a structure, in particular a floor, a wall or a ceiling, comprising a substrate, a first layer, a second layer, optionally a third layer and optionally a cover element, which is in particular a tile. In addition, the invention relates to the use of the mortar composition or the kit-of-parts for fixing tiles on a substrate, acoustic damping, noise reduction and/or vibration reduction.

BACKGROUND ART

Substrates, e.g. floor substrates, made of raw concrete usually are rough and uneven. This makes it difficult to fix coverings such as e.g. tiles, carpet, plastic flooring, veneer, etc. in a satisfying manner. Therefore, it is important to prepare even and smooth substrate surfaces prior to fixing or laying of coverings.

With regard to floor substrates, this can be achieved by applying leveling mortars onto the raw floor substrate in order to obtain an even and smooth underlayment. Leveling mortars can have high flow characteristics and a rather thin consistency such that once the product is mixed with water, it can simply be poured over the floor's uneven substrate and thereby even-out the surface. Likewise, they can have a higher consistency and be troweled after application.

EP 1 721 876 A1 (Sika) describes for example a process for the preparation of a self-leveling mortar. Thereby, a solid component that comprises an alkali-activated cementing material containing 10-20% of silica and alumina, 1-10% of a calcium aluminate cement or a white cement and fine aggregate is mixed together, with agitation, with a liquid component that comprises a 30-50% solution of sodium hydroxide, as well as sodium silicate, where the $SiO_2$ content is less than 30% and the $Na_2O$ content is less than 20%, the ratio between the liquid and the solid component being in the range 0.10-0.30 by weight.

In addition, from decorative tiled surfaces to highly functional tiled wall and floor finishes, tiling is one of the most popular surface finishing techniques that are used to enhance the appearance and functionality of all types of buildings and facilities.

A tiled structure typically comprises (i) a substrate, e.g. a supporting structure, (ii) optionally an underlayment, e.g. a leveling mortar, (iii) an adhesive, (iv) tiles, e.g. in the form of ceramic tiles, stones and/or veneers, as well as (iv) grouted joints and movement joints between the tiles. Thereby, tiles are fixed to the substrate or the underlayment with the adhesive. Depending on their composition, according to standard EN 12004:2017, tile adhesives are grouped into 3 main types: cementitious adhesives (C), dispersion adhesives (D) and reaction resin adhesives (R). Cementitious adhesives typically contain inter alia hydraulic cement, sand and fillers.

WO 2015/179738 A1 (Laticrete International, Inc.) describes for example ready to use grout and/or adhesive formulations that are suitable for use as a ceramic tile adhesive or as a tile grout, filling spaces between ceramic tiles. The formulations are based on a premixed cementitious slurry and an activation constituent for destabilizing the slurry by increasing its pH.

Furthermore, in buildings or facilities, the transmission of undesired sound or vibrations trough structural elements, floors, walls or ceilings is a challenging problem. Therefore, surfaces, especially tiled surfaces, are not only expected to be visually appealing and functional, but also to contribute to noise or vibration suppression. This is in particular true for floorings since foot noise is a major source of noise in buildings.

Although there are mortar composition that are highly beneficial in terms of smoothing and leveling of surfaces, they do not sufficiently contribute to noise or vibration suppression or they have other drawbacks.

There is thus a need to provide improved solutions, which overcome the aforementioned drawbacks.

DISCLOSURE OF THE INVENTION

It is an object of the present invention to provide an advantageous mortar composition, which is in particular beneficial for use as underlayment, intermediate layer or topping, especially as intermediate layer or underlayment in tiled structures. Especially, the mortar composition should be easy to process, have good flow characteristics and in particular it should be useful as leveling mortar composition for floorings. Preferably, the mortar composition should allow for producing constructional systems, especially tiled structures such as e.g. tiled floors, with high load capacities. At the same time, the mortar composition, optionally in combination with further elements, should contribute to noise or vibration reduction, especially in constructional systems, preferably in tiled structures, in particular in tiled floors.

Surprisingly, it has been found that these objects can be achieved by the features of claim 1. Thus, the core of the invention is a mortar composition, in particular a leveling mortar composition, comprising or consisting of:
  a) 10-50 wt. % of a hydraulic binder,
  b) 10-25 wt. % of lightweight aggregates,
  c) 30-50 wt. % of further aggregates which have a particle density that is higher than the particle density of the lightweight aggregates,
  d) 0.5-5 wt. % of a polymer.

Preparing the mortar composition is quite easy and safe: The mortar composition, in particular in dry state, is mixed with an appropriate amount of water. After this, the mortar composition is ready for application. Furthermore, the mortar composition itself can be a one-component mixture. This excludes the risk of a mix-up or wrong dosing of individual components by users.

After mixing with water, the inventive mortar compositions are easy to process. Thereby, a rather long pot life of around 20-60 minutes can be achieved. For example, even and smooth surfaces can be produced on rough and uneven floor substrates made of raw concrete.

In particular, the inventive mortar compositions can be formulated such that they are rather fast setting and drying, in particular when using Portland cement in combination with aluminate cement and/or sulphoaluminate cement as hydraulic binders. Such kind of compositions are especially suitable for use with low- and non-absorbing covering elements, such as e.g. non-absorbing tiles.

Especially, it is possible to formulate mortar compositions which after 24 hours after mixing with water have an internal humidity as low as ≤4 wt. %, in particular around 3.5 wt.-%. As it turned out, a mortar composition with such a low internal humidity is ready to be covered with a low- or a non-absorbent cover element.

Regarding the setting time, it is possible to formulate mortar compositions with a setting time of around 2 h. Thus, it is possible to obtain a cured material already after 6 h.

Moreover, the inventive compositions feature a rather low shrinkage. This is especially beneficial when covering the partially hardened mortar composition with covering elements such as tiles since even during the hardening process the mortar composition provides a stable base.

Regarding the hardening process, it is possible to formulate mortar compositions which develop a high compressive strength after a short time. This is in particular true when using Portland cement in combination with aluminate cement and/or sulphoaluminate cement as hydraulic binders. Especially, it is possible to obtain a compressive strength of >10 MPa, typically about 15 MPa, already after 6 h. Therefore, it is possible to walk on the hardened mortar composition already after 6 h.

As could be shown, the mortar compositions additionally feature good adhesion to different kind of materials, in particular concrete, mortar, mineral wool and adhesives, especially tile adhesives.

These beneficial properties allow for very efficient building processes with the inventive mortar compositions. For example, it is possible to apply a layer of mineral wool on raw concrete base and cover it with a layer of the inventive mortar composition at the same day. After 24 h latest, this structure can be covered covering elements, such as e.g. tiles that are fixed on the structure with a tile adhesive.

Thus, the mortar compositions are highly useful as underlayment for coverings such as e.g. tiles, carpet, plastic flooring, veneers, etc. Nevertheless, the mortar compositions are suitable as toppings as well, e.g. as warehouse floors. A topping acts as the actual finished surface, in particular a floor, without further covering.

At the same time, the mortar composition helps to suppress noise and/or vibrations, especially in tiled structures. For example, foot traffic noise on floorings can be reduced significantly. Specifically, with tiled flooring systems comprising the inventive mortar composition in combination with mineral wool and a tile adhesive, impact noise reductions up to 28 dB could be observed (according to ISO 10140-3:2010 and ISO 717-2).

Moreover, static load capacity tests showed that flooring systems comprising the inventive mortar compositions feature high mechanical stability, especially in combination with mineral wool. In addition, dynamic load capacity tests according to the standard ASTM C627-18 with tiled flooring systems comprising the inventive mortar composition have shown that the flooring systems can be considered suitable for heavy commercial applications.

Additional aspects of the invention are subject of further independent claims. Particularly preferred embodiments are outlined throughout the description and the dependent claims.

WAYS OF CARRYING OUT THE INVENTION

A first aspect of the present invention is directed to a mortar composition, in particular a leveling mortar composition, comprising or essentially consisting of:
a) 10-50 wt. % of a hydraulic binder,
b) 10-25 wt. % of lightweight aggregates,
c) 30-50 wt. % of further aggregates which have a particle density that is higher than the particle density of the lightweight aggregates,
d) 0.5-5 wt. % of a polymer.

In particular, all amounts are with respect to the total weight of the mortar composition in dry state.

In the present context, the expression "hydraulic binder" in particular stands for substances that harden because of chemical reactions with water producing hydrates. Preferably, the hydrates produced are not water-soluble. In particular, the hydration chemical reactions of the hydraulic binder takes essentially place independently of the water content. This means that the hydraulic binder can harden and retain its strength even when exposed to water, e.g. underwater or under high humid conditions.

The term "lightweight aggregates" stands in particular for aggregates with a particle density $\leq 2,000$ kg/m$^3$, preferably $\leq 1,500$ kg/m$^3$, especially $\leq 1,250$ kg/m$^3$. The particle density of an aggregate is the ratio between the mass of the particle material and the volume occupied by the individual particles. This volume includes the pores within the particle, but does not include voids between the particles. Especially, the particles of the aggregates can have any spherical and/or non-spherical geometric shape, either uniform or non-uniform. For example, the particles can be spherical-, conical-, polygonal-, cubic-, pentagon-, hexagon-, octagon-, prismatic and/or polyhedral-shaped. Non-uniform particles can have for example circular, elliptical, oval, square, rectangular, triangular or polygonal cross sections found at least partially therein. "Non-uniform" and "irregular" shaped particles refer to three-dimensional particle shapes wherein at least two different cross sections taken through said particles have different shapes.

In particular, the lightweight aggregates fulfill the requirements for lightweight aggregates as defined in DIN EN 13055:2016.

Especially, the mortar composition is a dry mortar composition. This means that the mortar composition is essentially free of water or an amount of water is below 1 wt. %, in particular below 0.5 wt. % or below 0.1 wt. %, with respect to the total weight of the mortar composition.

According to a preferred embodiment, the mortar composition is a one-component mixture. That means that all the individual materials and/or substances are intermixed. One-component compositions are in particular easy to handle and exclude the risk of a mix up or wrong dosing of individual components by users.

However, it is in principle possible to provide a two-component mortar composition or even a multi-component mortar composition. A first component may e.g. be present in a first receptacle comprising the hydraulic binder and the polymer. A second component, present in a second receptacle, may comprise the aggregates. Other distributions are possible as well. Two- or multi-component mortar compositions allow e.g. for adjusting the mortar composition with regard to specific applications.

A preferred amount of hydraulic binder is 20-45 wt. %, in particular 25-40 wt. %, especially 32-38 wt. %, with respect to the total weight of the mortar composition in dry state.

Preferably, the hydraulic binder comprises or consists of Portland cement, aluminate cement, sulphoaluminate cement, latent hydraulic and/or pozzolanic binder materials, calcium sulfate hemihydrate, anhydrite and/or hydrated lime. Especially preferred, the hydraulic binder comprises or consists of Portland cement, aluminate cement, sulphoaluminate cement, and/or latent hydraulic and/or pozzolanic binder materials.

Preferred Portland cement is according to standard EN 197, in particular of type CEM I. The term "alumina cement" stands in particular for a cement with an aluminum content, measured as $Al_2O_3$, of at least 30 wt. %, especially at least 35 wt. %, in particular 35-58 wt. %. Preferably, the alumina cement is alumina cement according to standard EN 14647. Preferably, the sulphoaluminate cement is calcium sulphoaluminate cement.

The term "latent hydraulic and/or pozzolanic binder materials" stands in particular for type II concrete additives with latent hydraulic and/or pozzolanic character according to EN 206-1. In particular, the latent hydraulic or pozzolanic binder material comprises or consists of slag, fly ash, silica fume, metakaolin and/or natural pozzolanes. Thereby, slag and/or fly ash, in particular furnace slag is especially preferred.

Calcium sulfate hemihydrate or $CaSO_4 \cdot 0.5\ H_2O$ may be present as α-hemi-hydrate or β-hemi-hydrate. Anhydrite is in particular anhydrite II and/or anhydrite III, whereas hydrated lime stands for calcium hydroxide.

Especially preferred, the hydraulic binder comprises aluminate cement and/or sulphoaluminate cement, preferably with a proportion of 15-40 wt. %, in particular 20-37 wt. %, especially 25-35 wt. %, with respect to the total weight of the mortar composition in dry state.

In particular, the hydraulic binder comprises Portland cement, preferably with a proportion of 3-18 wt. %, in particular 4-15 wt. %, especially 5-10 wt. %, with respect to the total weight of the mortar composition in dry state.

Especially, the hydraulic binder comprises Portland cement as well as aluminate cement and/or sulphoaluminate cement with a weight ratio of Portland cement to aluminate cement and/or sulphoaluminate cement from 0.05-3, especially 0.1-1, in particular 0.15-0.35.

In particular, the hydraulic binder comprises latent hydraulic and/or pozzolanic binder materials, especially slag and/or fly ash, preferably with a proportion of 0.1-10 wt. %, in particular 0.2-5 wt. %, especially 0.5-2 wt. %, with respect to the total weight of the mortar composition in dry state.

Preferably, the mortar composition comprises:
15-40 wt. %, in particular 20-37 wt. %, especially 25-35 wt. %, aluminate cement and/or sulphoaluminate cement;
optionally 3-18 wt. %, in particular 4-15 wt. %, especially 5-10 wt. %, Portland cement;
optionally 0.1-10 wt. %, in particular 0.2-5 wt. %, especially 0.5-2 wt. % latent hydraulic and/or pozzolanic binder materials, especially slag and/or fly ash;
whereby all amounts are with respect to the total weight of the mortar composition in dry state.

With regard to the lightweight aggregates, a particle density of the lightweight aggregates is preferably from 100-2,000 $kg/m^3$, especially 400-1,900 $kg/m^3$, preferably 700-1,500 $kg/m^3$ or 800-1,300 $kg/m^3$.

Especially, a proportion of the lightweight aggregates is from 10-25 wt. %, in particular 12-22 wt. %, especially 14-20 wt. %, with respect to the total weight of the mortar composition in dry state.

Especially, the lightweight aggregates comprise or consist of wood particles, plastic particles, rubber particles, inorganic particles, layered particles, hollow particles and/or porous particles, especially of hollow particles and/or inorganic porous particles.

In the present context, porous particles in particular have a porosity of at least 25 vol. %, especially at least 50 vol. %, in particular at least 75 vol. %, with respect to the total volume of the porous particles. Especially, porous particles are chosen from expanded polystyrene granules, expanded silica, expanded clay, and/or volcanic rock, e.g. pumice and/or perlite. Most preferred are clay particles and/or silicate particles. Within the context of this invention, "clay" stands in particular for phyllosilicates and/or sheet silicates.

In the present context, hollow particles in particular have a cavity of at least 25 vol. %, especially at least 50 vol. %, in particular at least 75 vol. %, with respect to the outer volume of the hollow particle. Preferably, hollow particles are chosen from hollow silicate particles, especially hollow silicate spheres, preferably hollow alumina-silicate spheres.

The term "layered particles" stands in particular for a material with a layered crystal structure. Especially, the layered material is a plate-like material. A plate-like material is in particular a material with a length and width larger than its thickness.

Preferably, the lightweight aggregates comprise or consist of inorganic particles, especially hollow inorganic particles and/or porous inorganic particles.

Preferably, the lightweight aggregates comprise particles with a spherical shape, in particular with a hollow spherical shape, especially silicate particles with a hollow spherical shape.

Highly preferred, the lightweight aggregates comprise or consist of expanded clay particles and/or hollow silicate particles. Most preferred, the lightweight aggregates comprise or consist of expanded clay aggregates and hollow silicate particles. Most preferred the hollow silicate particles are hollow silicate spheres.

In particular, a particle size of the lightweight aggregates is from 0.01-4,000 μm, especially 0.1-2,000 μm, preferably 0.5-500 μm.

The particle size can e.g. be determined by laser diffraction as described in ISO 13320:2009. Preferably, a particle size of non-spherical or irregular particles is represented by the equivalent spherical diameter of a sphere of equivalent volume. Especially, the lower values of the ranges given for the particle size represent D1 values whereas the upper values of the ranges given for the particle size represent D99 values. Put differently, in this case, 1% of the particles have a lower particle size than the lower value of a range, whereas 1% of the particles have a larger particle size than the upper value of a range.

Especially, the lightweight aggregates include two different types of particles, especially with two different particles sizes and/or whereby the two different types of particles have a chemically different composition. In particular, both types of the two different types of particles are inorganic particles. Preferably, a first type of particles are hollow silicate particles, especially hollow silicate spheres, and the second type of particles are expanded clay aggregates.

Preferably, a first type of particles, especially hollow silicate particles, have a particle size of below 1,000 μm, especially 0.01-1,000 μm, especially 0.5-500 μm, and a second type of particles, especially expanded clay aggregates, have a particle size of below 4,000 μm, in particular 0.01-4,000 μm, especially 0.05-2,000 μm.

In particular, a weight ratio of the first type of particles, especially hollow silicate particles, to the second type of particles, especially expanded clay aggregates, is from 1:2-10:1, in particular 1:1-5:1, especially 1.2:1-4:1 or 1.5:1-2.5:1.

In another embodiment, the lightweight aggregates can comprise or consist of rubber particles. In the present context, the term "rubber" stands in particular for an elastomer, especially a thermoset. Rubber particles can consist of natural and/or synthetic rubber. The rubber is chemically different from the above-mentioned polymer.

In particular, the rubber particles comprise or consist of natural polyisoprene; synthetic polyisoprene; polybutadiene; chloroprene rubber, such as e.g. polychloroprene, neoprene, baypren; butyl rubber, in particular copolymers of isobutylene and isoprene; halogenated butyl rubber, such as e.g. chloro butyl rubber, bromo butyl rubber; styrene-butadiene rubber, in particular copolymers of styrene and butadiene, nitrile rubber, in particular a copolymer of butadiene and acrylonitrile and/or hydrogenated nitrile rubber.

For example, the rubber particles are recycled rubber particles, in particular obtained from worn shoes and/or tires. For example, the rubber particles are derived from rubber products, e.g. end-of-life tires, through cryogenic milling.

Especially, the lightweight aggregates include to different types of rubber particles, especially with two different particles sizes. Preferably, a first type of the rubber particles have a particle size of 0.01-0.5 mm, especially 0.1-0.4 mm, and a second type of the rubber particles have a particle size of 0.6-2 mm, especially 0.6-1.5 mm.

In particular, a weight ratio of the first type of rubber particles having a smaller particle size to the second type of rubber particles having a larger particle is from 1:2-8:1, in particular 1:1-5:1, especially 2:1-4:1 or 2.5:1-3.5:1.

Preferably, the rubber have a none-spherical or irregular shape.

However, the lightweight aggregates may also comprise or consist of layered materials, cork and/or plastics, in particular recycled plastics. For example, the lightweight aggregates comprise or consist of polyethylene terephthalate (PET), mica and/or vermiculite.

Most preferred, the lightweight aggregates comprise or consist of:
  3-25 wt. %, especially 5-20 wt. %, preferably 7-15 wt. %, of hollow silicate particles;
  1-15 wt. %, especially 2-10 wt. %, preferably 4-8 wt. %, expanded clay aggregates;
  whereby, preferably, the hollow silicate particles have a particle size of below 1,000 µm, especially 0.01-1,000 µm, especially 0.5-500 µm, and the expanded clay particles, have a particle size of below 4,000 µm, in particular 0.01-4,000 µm, especially 0.05-2,000 µm;
  whereby, preferably, a weight ratio of the hollow silicate particles to the expanded clay particles, is from 1:2-10:1, in particular 1:1-5:1, especially 1.2:1-4:1 or 1.5:1-2.5:1.
  wherein all of the proportions are with respect to the total weight of the mortar composition in dry state.

The further aggregates have a particle density that is higher than the particle density of the lightweight aggregates. In particular, the further aggregates have a particle density >2,000 kg/m$^3$, especially >2,100 kg/m$^3$ or >2,200 kg/m$^3$.

Preferably, a proportion of the further aggregates is from 32-50 wt. %, especially 37-48 wt. %, with respect to the dry weight of the mortar composition.

A particle size of the further aggregates is preferably below 2 mm, especially in the range of 0.01-2 mm, preferably 0.05-1 mm, in particular 0.1-0.4 mm.

In particular, the further aggregates comprise sand, quartz, calcium carbonate, natural river sand, gravel, basalt and/or metallic aggregates. Highly preferred are sand and/or calcium carbonate, especially sand.

In particular, the particle density of the lightweight aggregates is from 400-1,900 kg/m$^3$, preferably 700-1,500 kg/m$^3$ or 800-1,300 kg/m$^3$ and the further aggregates have a particle density >2,000 kg/m$^3$.

Especially, the particle density of the lightweight aggregates is from 700-1,500 kg/m$^3$ and the further aggregates have a particle density >2,100 kg/m$^3$.

Preferably, the lightweight aggregates comprise or consist of wood particles, plastic particles, rubber particles, inorganic particles, layered particles, hollow particles and/or porous particles, especially of hollow particles and/or inorganic porous particles, and the further aggregates comprise sand, quartz, calcium carbonate, natural river sand, gravel, basalt and/or metallic aggregates, especially sand and/or calcium carbonate.

Preferably, the polymer used in the mortar composition is a water-soluble or water-redispersible polymer, in particular a redispersible polymer. Such polymers have proven to be beneficial in the present mortar compositions. However, e.g. for specific purposes, other polymers might be suitable as well.

Preferably, the polymer is present in solid state, especially as a powder.

Preferably, the polymer has a glass transition temperature of −45-10° C., especially −35-5° C., preferably −25-0° C., in particular −20-0° C., particularly preferred −20-10° C. Such polymers can further improve the strength and noise suppression properties of the mortar composition. Most preferred are redispersible polymers with these glass transition temperatures.

The glass transition temperature is determined by Differential Scanning calorimetry according to standard ASTM E1356-08(2014).

Especially, the polymer is a homopolymer or copolymer based on one or more monomers selected from a vinyl ester, vinyl acetate, vinyl alcohol, vinyl chloride, vinyl laureate, acrylic acid, acrylate, methacrylic acid, methacrylate, methylmethacrylate, acrylonitrile, styrene, butadiene, ethylene or mixtures thereof.

Highly preferred are copolymers based on vinyl acetate and ethylene.

Preferably, the polymer is selected from poly(vinyl acetate-ethylen), poly(vinyl acetate-ethylen-methylmethacrylate), poly(vinyl acetate-ethylen-vinylester), poly(vinyl acetate-ethylen-acrylic acid ester), poly(vinyl acetate-ethylen-vinyl laureate), poly(vinyl acetate-vinyl versate), poly(acrylic ester-acrylonitrile), poly(acrylic ester-styrene butadiene) or mixtures thereof. Highly preferred as the polymer is a poly(vinyl acetate-ethylene).

However, other polymers might be suitable as well.

A preferred amount of the polymer is 0.75-3 wt. %, in particular 0.8-2.75 wt. %, especially 0.9-2 wt. %, with respect to the total weight of the mortar composition.

Preferably, a weight ratio of the polymer to the hydraulic binder in the mortar composition is from 0.005-0.5, in particular, 0.01-0.3, especially, 0.01-0.2, particularly 0.015-0.1 or 0.02-0.04.

Preferably, a weight ratio of the lightweight aggregates to the polymer is from 2-50, in particular 5-30, especially 10-20. This is in particular true if the lightweight aggregates comprise or consist of inorganic particles, especially porous inorganic particles and/or hollow inorganic particles, and the polymer is a redispersible polymer.

Especially, a weight ratio of the further aggregates to the polymer is from 6-100, in particular 15-70, especially 30-50. This is in particular true if the further aggregates comprise or consist of sand and the polymer is a redispersible polymer.

Furthermore, it can be beneficial if the mortar composition comprises at least one additive selected from the group consisting of setting time regulators, plasticizers, defoamers, rheology modifiers, thixotropic agents, aerating and/or foaming agents, anti-shrinkage agents, corrosion inhibitors, fire-retarding agents, fibers, and chromium reducers.

Preferably, a proportion of the additives in total is from 0-10 wt. %, especially 0.5-5 wt. %, with respect to the weight of the mortar composition in dry state.

Especially the mortar composition comprises a rheology modifying agent. A proportion of the rheology modifying agent is preferably from 0.001-1 wt. %, in particular 0.01-0.5 wt. %, with respect to the weight of the mortar composition in dry state.

According to another preferred embodiment, the mortar composition comprises a plasticizer, whereby the plasticizer is in particular selected from the group of lignosulfonates, gluconates, naphtalenesulfonates, melamine sulfonates, vinyl copolymers and/or polycarboxylate ethers. Polycarboxylate ethers are preferred. In particular, the plasticizer is chemically different from the above-mentioned polymer and rubber. A proportion of polycarboxylate ethers is preferably from 0.001-1 wt. %, in particular 0.1-0.5 wt. %, with respect to the weight of the mortar composition in dry state.

Preferably, the mortar composition comprises fibers, in particular glass, plastic and/or cellulose fibers. Glass fibers and/or plastic fibers are highly preferred. Highly preferred plastic fibers are polyalkylene fibers, e.g. polyethylene fibers.

A proportion of the fibers is preferably from 0.001-3 wt. %, in particular 0.01-2.0 wt. %, especially 0.1-1 wt. %, with respect to the weight of the mortar composition in dry state.

A preferred length of the fibers is from 0.05-12 mm, especially 0.05-5 mm. A diameter of the fibers is for example 0.5-1,000 µm, especially 1-100 µm, in particular 5-40 µm.

A preferred length of the glass fibers is from 0.5-12 mm, especially 2-5 mm. A diameter of the fibers is for example 0.5-1,000 µm, especially 1-100 µm, in particular 5-40 µm.

A preferred length of the plastic fibers is from 0.05-2 mm, especially 0.1-0.5 mm. A diameter of the plastic fibers is for example 0.5-1,00 µm, especially 1-100 µm, in particular 5-40 µm.

A preferred mortar composition comprises or essentially consists of:
- 15-40 wt. %, of calcium aluminate cement and/or sulphoaluminate cement;
- optionally 3-18 wt. %, in particular 4-15 wt. %, especially 5-10 wt. %, Portland cement;
- optionally 0.1-10 wt. % latent hydraulic and/or pozzolanic binder materials, especially slag and/or fly ash;
- 10-25 wt. %, in particular 12-22 wt. %, especially 14-20 wt. %, of lightweight aggregates comprising or consisting of porous inorganic particles, especially expanded aggregates and/or hollow aggregates, in particular expanded clay aggregates and/or hollow silicate spheres;
- 30-50 wt. %, in particular 37-50 wt. %, of further aggregates comprising or consisting of quartz, sand and/or calcium carbonate;
- 0.5-5 wt. %, especially 0.75-3 wt. %, of a water soluble or water redispersible polymer, especially a copolymer based vinyl acetate and ethylene;
- 0-10, especially 0.5-5 wt. %, of one or more additives;
whereby all amounts are with respect to the total weight of the mortar composition in dry state.

A highly preferred mortar composition comprises or essentially consists of:
- 20-37 wt. %, wt. % of calcium aluminate cement and/or sulphoaluminate cement;
- 4-15 wt. %, especially 5-10 wt. %, Portland cement;
- optionally 0.1-10 wt. % latent hydraulic and/or pozzolanic binder materials, especially slag and/or fly ash;
- 12-22 wt. %, especially 14-20 wt. %, of lightweight aggregates comprising or consisting of expanded clay aggregates and/or hollow silicate spheres;
- 37-50 wt. %, of further aggregates comprising or consisting of sand;
- 0.75-3 wt. %, of a water soluble or water redispersible polymer, especially a copolymer based vinyl acetate and ethylene;
- 0-10, especially 0.5-5 wt. %, of one or more additives;
wherein, preferably, a weight ratio of the polymer to the hydraulic binder in the mortar composition is from 0.005-0.5, in particular, 0.01-0.3, especially, 0.01-0.2, particularly 0.015-0.1 or 0.02-0.04;
whereby all amounts are with respect to the total weight of the mortar composition in dry state.

Another aspect of the present invention relates to a method for producing a processable mortar composition, comprising the step of adding water to a mortar composition as described above.

Thereby, preferably, a weight ratio of water to the mortar composition in dry state is from 0.12-0.50, in particular 0.18-0.35, especially 0.21-0.27 or 0.22-0.25.

The consistency of the mortar compositions can be controlled with the proportion of water. Thereby, the strength of the mortar compositions in hardened state vary relatively little within an acceptable range. Specifically, when adding sufficient water, it is possible to achieve a self-levelling consistency of the mortar composition which might be beneficial for flooring applications. However, when reducing the water content, a consistency suitable for troweling can be achieved.

A further aspect of the present invention is a hardened mortar composition obtainable by adding water to a mortar composition as described above or obtainable by the method as described above. Preferably, the mortar composition is placed on a substrate, in particular on a floor, especially made of concrete and/or on an interlayer, e.g. made of mineral wool.

Especially, the mortar composition in hardened state shows a certain flexibility. Preferably, the transversal deformation of the mortar composition in hardened state fulfills criteria S1 or S2 according to standard EN 12004:2017.

This is in particular beneficial if the mortar composition is combined with mineral wool. A flexible mortar composition or mortar composition with such transversal deformation capabilities can better withstand local deformations even if placed on rather flexible materials such as mineral wool.

Highly preferred, the mortar composition exhibits one or more of the following properties (according to EN 12004-1/2:2017, EN 1346 and EN 1348):
- Initial adhesion (after dry storage) ≥0.5, especially ≥1.0 MPa
- Adhesion after water immersion ≥0.5, especially ≥1.0 MPa
- Adhesion after heating ≥0.5, especially ≥1.0 MPa
- Adhesion after freeze-thaw cycles ≥0.5, especially ≥1.0 MPa
- Extended open time ≥0.5 MPa after 10 minutes, especially after 20 minutes, preferably after 30 minutes
- Transversal deformation ≥2.5 mm, especially ≥5 mm.

Preferably, the mortar composition fulfils criteria C1 S1, C1E S1, C1E S2, C1E S2, C2 S2 or C2E S2, according to standard EN 12004:2017.

Preferably, the hardened mortar composition is present in the form of a layer, a coating and/or a sheet, especially placed on a substrate and/or on an interlayer.

Preferably, a thickness of the hardened mortar composition is from 4-50 mm, preferably 10-35 mm, especially 15-25 mm or 18-22 mm.

Another aspect of the present invention relates to a kit-of-parts comprising or consisting of:
  (i) a mortar composition as described above, in particular in dry state;
  (ii) optionally, mineral wool, especially stone wool, slag wool and/or glass wool;
  (iii) optionally, an adhesive composition, especially a tile adhesive, in particular in dry state, whereby the adhesive composition comprises or consists of:
    a) 10-50 wt. % of a hydraulic binder,
    b) 20-60 wt. % of lightweight aggregates,
    c) 10-25 wt. % of a polymer;
  and whereby the adhesive composition is chemically different from the mortar composition, whereby, in particular, all proportions given for the adhesive composition are with respect to the total weight of the adhesive composition in dry state;
wherein, in addition to the mortar composition, the kit-of-parts comprises either the mineral wool, or the adhesive composition, or both.

In particular, "mineral wool" stands for any fibrous material formed by spinning or drawing molten mineral or rock materials, such as e.g. stone, glass, slag and/or ceramics. Especially, the mineral wool is present in the form of a fabric, preferably consisting to an extent of at least 75 wt. %, preferably at least 90 wt. % or 95 wt. % of fibrous material consisting of stone, glass, slag and/or ceramics.

"Chemically different" in particular means that the compositions differ at least in a chemical component, the percentage of a component, a chemical structure of a component and/or a particle size of a component.

Thus, a highly preferred kit-of-parts can comprise or consist of (i) the mortar composition and (ii) the mineral wool. Another preferred kit-of-parts can comprise or consist of (i) the mortar composition and (iii) the adhesive composition. A further preferred kit-of-parts can comprise or consist of (i) the mortar composition and (ii) the mineral wool and (iii) the adhesive composition.

Most preferred, the kit-of-parts comprises the mortar composition and the mineral wool, and optionally the adhesive composition.

As it turned out, the combination of the inventive mortar composition with the mineral wool allows for preparing structures, e.g. floor structures, with surprisingly effective noise and vibration reduction. Nevertheless, the structures can withstand rather high pressure forces.

Preferably, the kit-of-parts is provided as a two-component product or a three component product. A three component product is preferred if the kit-of-parts comprises mineral wool and an adhesive composition.

Preferably, a first component of the product is present in a first receptacle comprising the mortar composition and a second component of the product is present in a second receptacle comprising the mineral wool or the adhesive composition, and, optionally, a third component is present in a third receptacle comprising the remaining component not included in the first or the second receptacle.

Especially preferred, a first component of the product is present in a first receptacle comprising the mortar composition and a second component of the product is present in a second receptacle comprising the mineral wool and, optionally, a third component is present in a third receptacle comprising the adhesive composition.

However, it is also possible to provide a multi-component product with more than two or more than three components. In this case, for example, the mortar composition and/or the adhesive composition as such can be provided in two separate receptacles. Multi-component products allow e.g. for adjusting the adhesive composition and/or the mortar composition with regard to specific applications.

Preferably, the mineral wool is chosen from stone wool, slag wool, glass wool alkaline earth silicate wool, aluminosilicate wool, polycrystalline wool (based on aluminum oxide, $Al_2O_3$) and/or kaowool (based on kaolin). Most preferred is stone wool, slag wool and/or glass, especially stone wool.

Preferably, the mineral wool is present in the form of a flat plate and/or a mat, preferably with a thickness in the range of 3-100 mm, especially 5-50 mm, preferably 7-25 mm or 8-16 mm. In the present context, a mat and flat plate is a three-dimensional object, especially a cuboid, having a length, a width and a thickness, whereby the thickness is smaller than the length and the thickness is smaller than the width.

In the following, the optional adhesive composition is described in more detail. Thereby, if not otherwise stated, the general meaning of the terms "hydraulic binder", "lightweight aggregates", "alumina cement", "latent hydraulic and/or pozzolanic binder materials", and "rubber" is the same as described above in connection with the mortar composition.

Especially, the adhesive composition is a dry adhesive composition. This means that the adhesive composition is essentially free of water or an amount of water is below 1 wt. %, in particular below 0.5 wt. % or below 0.1 wt. %, with respect to the total weight of the adhesive composition.

According to a preferred embodiment, the adhesive composition is a one-component mixture. That means that all the individual materials and/or substances are intermixed. One-component compositions are in particular easy to handle and exclude the risk of a mix up or wrong dosing of individual components by users.

However, it is in principle possible to provide a two-component adhesive composition or even a multi-component adhesive composition. A first component may e.g. be present in a first receptacle comprising the hydraulic binder and the polymer. A second component, present in a second receptacle, may comprise the aggregates. Other distributions are possible as well. Two- or multi-component adhesive compositions allow e.g. for adjusting the adhesive composition with regard to specific applications.

A preferred amount of hydraulic binder of the adhesive composition is 21-50 wt. %, in particular 25-45 wt. %, especially 30-40 wt. %, with respect to the total weight of the adhesive composition in dry state.

Preferably, a weight ratio of the polymer to the hydraulic binder in the adhesive composition is from 0.1-5, in particular, 0.2-2.5, especially, 0.2-1, particularly 0.3-0.8 or 0.3-0.6.

Preferably, the hydraulic binder of the adhesive composition comprises or consists of cement. Preferably, the cement is Portland cement and/or alumina cement and/or sulphoaluminate cement.

Preferred Portland cement is according to norm EN 197, in particular of type CEM I. Preferably, the alumina cement is alumina cement according to standard EN 14647. Preferably, the sulphoaluminate cement is calcium sulphoaluminate cement.

A preferred amount of Portland cement in the adhesive composition is 10-40 wt. %, in particular 20-35 wt. %, especially 25-30 wt. %, with respect to the total weight of the adhesive composition in dry state.

In particular, the hydraulic binder of the adhesive composition comprises two different types of Portland cements, especially two types of Portland cements of different strength classes. Especially, a Portland cement of strength class 42.5 N is combined with a Portland cement of strength class 52.5 N. Strength classes are according to EN 197-1: 2011.

Preferably, in the adhesive composition a proportion of the cement with the lower strength class is higher that the proportion of the cement with the higher strength class. In particular, the proportion of the cement with the lower strength class is a factor of 1.5-5 higher than the proportion of the cement with the lower strength class.

Such a mix of different Portland cements turned out to be highly beneficial in terms of noise suppression, adhesion and strength development of the hardened adhesive composition.

Preferably, the adhesive composition comprises alumina cement and/or sulphoaluminate cement, preferably sulphoaluminate cement. In particular, a proportion of these cements in the adhesive composition is from 1-15 wt. %, in particular 3-10 wt. %, especially, 4-7 wt. %, with respect to the total weight of the adhesive composition in dry state.

According to a further preferred embodiment, the hydraulic binder of the adhesive composition comprises Portland cement and sulphoaluminate cement, in particular calcium sulphoaluminate cement.

Even more preferred, the hydraulic binder of the adhesive composition comprises two different types of Portland cements, especially two types of Portland cements of different strength classes, in combination with a sulphoaluminate cement, in particular calcium sulphoaluminate cement. The two types of Portland cements of different strength classes are in particular chosen as described above.

Sulphoaluminate cements, especially in combination with Portland cements, have been proven to be especially advantageous for the adhesive composition.

A weight ratio of Portland cement to sulphoaluminate cement in the adhesive composition is preferably from 2-10, especially 3-8, in particular 4-7 or 5-6.

According to a preferred embodiment, the adhesive composition comprises 10-40 wt. %, in particular 20-35 wt. %, especially 25-30 wt. %, Portland cement and 1-15 wt. %, in particular 3-10 wt. %, especially, 4-7 wt. %, sulphoaluminate cement, each with respect to the total weight of the adhesive composition in dry state, as hydraulic binder. In addition, in this case, preferably, two types of Portland cements of different strength classes are chosen, as described above.

Moreover, the hydraulic binder of the adhesive composition can optionally comprise or consist of latent hydraulic and/or pozzolanic binder materials. In particular, the latent hydraulic or pozzolanic binder material comprises or consists of slag, fly ash, silica fume, metakaolin and/or natural pozzolanes. Thereby, slag, in particular furnace slag is especially preferred.

Preferably, in the adhesive composition a proportion of the latent hydraulic and/or pozzolanic binder materials is from 0.5-20 wt. %, in particular 2-10 wt. %, especially 3-7 wt. %, with respect to the total weight of the adhesive composition in dry state.

According to a preferred embodiment, the hydraulic binder of the adhesive composition comprises in combination:

10-40 wt. %, in particular 20-35 wt. %, especially 25-30 wt. %, Portland cement, with respect to the total weight of the adhesive composition in dry state; and 1-15 wt. %, in particular 3-10 wt. %, especially, 4-7 wt. %, sulphoaluminate cement, with respect to the total weight of the adhesive composition in dry state. Also in this case, preferably, two types of Portland cements of different strength classes are chosen, as described above; and from 0.5-20 wt. %. in particular 2-10 wt. %, especially 4-8 wt. %, latent hydraulic and/or pozzolanic binder materials, especially slag and/or fly ash, with respect to the total weight of the adhesive composition in dry state.

With regard to the lightweight aggregates of the adhesive composition, a particle density of the lightweight aggregates is preferably from 100-2,000 kg/m$^3$, especially 400-1,900 kg/m$^3$, preferably 700-1,500 kg/m$^3$ or 800-1,300 kg/m$^3$.

Especially, a proportion of the lightweight aggregates of the adhesive composition is from 20-50 wt. %, in particular 25-55 wt. %, especially 35-45 wt. %, with respect to the total weight of the adhesive composition in dry state.

Preferred lightweight aggregates of the adhesive composition comprise or consist of wood particles, rubber particles, plastic particles and/or porous particles, especially porous inorganic particles. More preferred particles are rubber particles and/or porous particles. Most preferred particles are rubber particles.

Rubber particles can consist of natural and/or synthetic rubber. The rubber is chemically different from the above-mentioned polymer of the adhesive composition.

In particular, the rubber particles of the adhesive composition comprise or consist of natural polyisoprene; synthetic polyisoprene; polybutadiene; chloroprene rubber, such as e.g. polychloroprene, neoprene, baypren; butyl rubber, in particular copolymers of isobutylene and isoprene; halogenated butyl rubber, such as e.g. chloro butyl rubber, bromo butyl rubber; styrene-butadiene rubber, in particular copolymers of styrene and butadiene, nitrile rubber, in particular a copolymer of butadiene and acrylonitrile and/or hydrogenated nitrile rubber.

For example, the rubber particles are recycled rubber particles, in particular obtained from worn shoes and/or tires. For example, the rubber particles are derived from rubber products, e.g. end-of-life tires, through cryogenic milling.

In a further preferred embodiment, the lightweight aggregates of the adhesive composition comprise or consist of porous particles. In particular, the porous particles have a porosity of at least 25 vol. %, especially at least 50 vol. %, in particular at least 75 vol. %, with respect to the total volume of the porous particles.

Especially, the porous particles of the adhesive composition are chosen from expanded polystyrene granules, expanded silica, volcanic rock, e.g. pumice and/or perlite. Expanded silica is highly preferred.

However, the lightweight aggregates of the adhesive composition may also comprise or consist of cork and/or plastics, in particular recycled plastics. For example, the lightweight aggregates comprise or consist of polyethylene terephthalate (PET).

Preferably, a particle size of the lightweight aggregates of the adhesive composition is from 0.01-2 mm, especially 0.05-1.5 mm, preferably 0.1-1.0 mm, in particular 0.1-0.6 mm. This is in particular true independently of the type of lightweight aggregate used in the adhesive composition.

Also in this case, the particle size can e.g. be determined by laser diffraction as described in ISO 13320:2009. Preferably, a particle size of non-spherical or irregular particles is represented by the equivalent spherical diameter of a sphere of equivalent volume. Especially, the lower values of the ranges given for the particle size represent D1 values whereas the upper values of the ranges given for the particle size represent D99 values. Put differently, in this case, 1% of the particles have a lower particle size than the lower value of a range, whereas 1% of the particles have a larger particle size than the upper value of a range.

Especially, the adhesive composition comprises 30-60 wt. %, especially 35-55 wt. %, of rubber particles and 1-15 wt. %, especially 3-10 wt. %, of porous particles, preferably porous inorganic particles, as lightweight aggregates. Thereby expanded silica or glass is most preferred as inorganic particles.

According to a highly preferred embodiment, in the adhesive composition a proportion of aggregates with a particle density >2,000 kg/m$^3$, especially >2,100 kg/m$^3$ or >2,200 kg/m$^3$, is <25 wt. %, especially <10 wt. %, preferably <5 wt. % or <1 wt. %. In particular, the adhesive composition does not comprise any aggregates with a particle density >2,000 kg/m$^3$, especially >2,100 kg/m$^3$ or >2,200 kg/m$^3$.

Especially, in the adhesive composition a proportion of sand, quartz, calcium carbonate, natural river sand, gravel, basalt and/or metallic aggregates is <25 wt. %, especially <10 wt. %, preferably <5 wt. % or <1 wt. %. Especially, the adhesive composition does not comprise any of such aggregates.

Preferably, the polymer used in the adhesive composition is a water-soluble or water-redispersible polymer, in particular a redispersible polymer. Such polymers have proven to be beneficial in the present adhesive compositions. However, e.g. for specific purposes, other polymers might be suitable as well.

Preferably, the polymer of the adhesive composition is present in solid state, especially as a powder.

Especially, the polymer of the adhesive composition is used as a binder in order to control strength of the adhesive composition.

Preferably, the polymer of the adhesive composition has a glass transition temperature of −45-10° C., especially −35-5° C., preferably −25 0° C., in particular −20-0° C., particularly preferred −20--10° C. Such polymers can further improve the strength and noise suppression properties of the adhesive composition. Most preferred are redispersible polymers with these glass transition temperatures.

Especially, the polymer of the adhesive composition is a homopolymer or copolymer based on one or more monomers selected from a vinyl ester, vinyl acetate, vinyl alcohol, vinyl chloride, vinyl laureate, acrylic acid, acrylate, methacrylic acid, methacrylate, methylmethacrylate, acrylonitrile, styrene, butadiene, ethylene or mixtures thereof.

Highly preferred polymers of the adhesive composition are copolymers based on vinyl esters, ethylene and acrylic acid esters.

Preferably, the polymer of the adhesive composition is selected from poly(vinyl acetate-ethylen), poly(vinyl acetate-ethylen-methylmethacrylate), poly(vinyl acetate-ethylen-vinylester), poly(vinyl acetate-ethylen-acrylic acid ester), poyl(vinyl acetate-ethylen-vinyl laureate), poly(vinyl acetate-vinyl versate), poly(acrylic ester-acrylonitrile), poly(acrylic ester-styrene butadiene) or mixtures thereof. Highly preferred as the polymer is a poly(vinyl ester-ethylene-acrylic acid ester).

However, other polymers might be suitable as well for the adhesive composition.

A preferred amount of the polymer in the adhesive composition is 10-20 wt. %, in particular 12-18 wt. %, especially 13-17 wt. %, with respect to the total weight of the adhesive composition.

Preferably, in the adhesive composition a weight ratio of the lightweight aggregates to the polymer is from 1-10, in particular 1.5-7, especially 2-5. This is in particular true if the lightweight aggregates comprise or consist of rubber and the polymer is a redispersible polymer.

Furthermore, it can be beneficial if the adhesive composition comprises an additive selected from the group consisting of setting time regulators, plasticizers, defoamers, rheology modifiers, thixotropic agents, aerating and/or foaming agents, anti-shrinkage agents, corrosion inhibitors, fire-retarding agents, fibers, and chromium reducers.

Preferably, a proportion of the additives of the adhesive composition in total is from 0-5 wt. %, especially 1-5 wt. % with respect to the weight of the adhesive composition in dry state.

Preferably, the adhesive composition comprises a layered silicate, in particular a phyllosilicate, as an additive. Preferably, the layered silicate is a bentonite or an aluminum phyllosilicate. Especially, a layered silicate is used in combination with rubber particles as described above. As it turned out, layered silicates help to stabilize rubber particles in the adhesive composition.

A proportion of the layered silicate of the adhesive composition is preferably from 0.01-2 wt. %, in particular 0.1-1 wt. %, especially 0.2-0.7 wt. %, with respect to the weight of the adhesive composition in dry state.

Especially the adhesive composition comprises a thixotropic agent, in particular silica, silica fume, cellulose, and/or saccharides. A proportion of the thixotropic agent of the adhesive composition is preferably from 0.001-1 wt. %, in particular 0.1-0.5 wt. %, with respect to the weight of the adhesive composition in dry state.

According to another preferred embodiment, the adhesive composition comprises a plasticizer, whereby the plasticizer is in particular selected from the group of lignosulfonates, gluconates, naphtalenesulfonates, melamine sulfonates, vinyl copolymers and/or polycarboxylate ethers. Polycarboxylate ethers are preferred. In particular, the plasticizer is chemically different from the above-mentioned polymer and rubber of the adhesive composition. A proportion of polycarboxylate ethers in the adhesive composition is preferably from 0.001-1 wt. %, in particular 0.1-0.5 wt. %, with respect to the weight of the adhesive composition in dry state.

Preferably, the adhesive composition comprises fibers, in particular glass, plastic and/or cellulose fibers. Glass fibers are highly preferred. A proportion of the fibers of the adhesive composition is preferably from 0.001-3 wt. %, in particular 0.01-2.0 wt. %, especially 0.1-1 wt. %, with respect to the weight of the adhesive composition in dry state. A preferred length of the fibers of the adhesive composition is from 0.5-12 mm, especially 2-5 mm. A diameter of the fibers of the adhesive composition is for example 0.5-1,000 μm, especially 1-100 μm, in particular 5-40 μm.

A preferred adhesive composition comprises or essentially consists of:
- 25-45 wt. % of hydraulic binder, especially comprising Portland cement, and sulphoaluminate cement and optionally fly ash;
- 35-55 wt. % of rubber aggregates, especially with a particle size of 0.1-1.0 mm, preferably 0.1-0.6 mm;
- 10-25 wt. % of a water redispersible polymer, especially with a glass transition temperature of −20-0° C.;

0-5 wt. %, especially 1-5 wt. %, of one or more additives; and wherein, preferably, a proportion of aggregates with a particle density >2,000 kg/m³ is <5 wt. % or <1 wt. %, whereby the proportions are with respect to the weight of the adhesive composition in dry state.

A highly preferred adhesive composition comprises or essentially consists of:
- 20-30 wt. % of Portland cement, especially of two different types of Portland cement;
- 3-10 wt. % of calcium sulphoaluminate cement;
- optionally 4-8 wt. % latent hydraulic and/or pozzolanic binder materials, especially slag and/or fly ash;
- 35-55 wt. % of rubber aggregates, especially with a particle size of 0.1-1.0 mm, preferably 0.1-0.6 mm;
- 3-10 wt. % of porous inorganic particles, especially with a particle size of 0.1-0.6 mm;
- 10-25 wt. % of a water redispersible polymer, especially with a glass transition temperature of −20-0° C.;
- 0-5, especially 1-5 wt. %, of one or more additives; and wherein, preferably, a proportion of aggregates with a particle density >2,000 kg/m³ is <5 wt. % or <1 wt. %, whereby the proportions are with respect to the weight of the adhesive composition in dry state.

In the kit-of parts, preferably, a proportion of the lightweight aggregates, especially rubber particles, in the adhesive composition is higher than a proportion of lightweight aggregates, especially porous inorganic particles and/or hollow inorganic particles, in the mortar composition. Especially, the proportion of lightweight aggregates in the adhesive composition is 1.1-8 times, especially 1.5-6 times or 2-4 times, higher than the proportion of the lightweight aggregates in the mortar composition.

Especially, in the kit-of-parts, a weight proportion of Portland cement in the adhesive composition is higher than a proportion of Portland cement in the mortar composition. Preferably, in the kit-of-parts, a weight proportion of aluminate cement and/or sulphoaluminate cement in the adhesive composition is lower than a proportion of aluminate cement and/or sulphoaluminate cement in the mortar composition Preferably, in the kit-of parts, the polymer of the adhesive composition is chemically different form the polymer of the mortar composition. Preferably, a glass transition temperature of the polymer of the adhesive composition is different form the glass transition temperature of the polymer of the mortar composition.

A preferred kit-of-parts composition comprises or consists of:
(i) a mortar composition as described above comprising:
- 10-25 wt. %, in particular 12-22 wt. %, especially 14-20 wt. %, of lightweight aggregates comprising or consisting of porous inorganic particles and/or hollow inorganic particles, in particular expanded clay aggregates and/or hollow silicate spheres;
- 30-50 wt. %, in particular 37-50 wt. %, of further aggregates comprising or consisting of quartz, sand and/or calcium carbonate whereby the proportions are with respect to the weight of the mortar composition in dry state; and
(ii) mineral wool, especially stone wool;
(iii) optionally, an adhesive composition comprising or essentially consisting of:
- hydraulic binder comprising Portland cement and sulphoaluminate cement and optionally fly ash;
- 35-55 wt. % of rubber aggregates, especially with a particle size of 0.1-1.0 mm, preferably 0.1-0.6 mm;

wherein, preferably, a proportion of aggregates with a particle density >2,000 kg/m³ is <5 wt. % or <1 wt. %, whereby the proportions are with respect to the weight of the adhesive composition in dry state.

A more preferred kit-of-parts composition comprises or consists of:
(i) a mortar composition comprising or essentially consisting of:
- 15-40 wt. %, of calcium aluminate cement and/or sulphoaluminate cement;
- optionally 3-18 wt. %, in particular 4-15 wt. %, especially 5-10 wt. %, Portland cement;
- optionally 0.1-10 wt. % latent hydraulic and/or pozzolanic binder materials, especially slag and/or fly ash;
- 10-25 wt. %, in particular 12-22 wt. %, especially 14-20 wt. %, of lightweight aggregates comprising or consisting of porous inorganic particles, especially expanded aggregates and/or hollow aggregates, in particular expanded clay aggregates and/or hollow silicate spheres;
- 30-50 wt. %, in particular 37-50 wt. %, of further aggregates comprising or consisting of quartz, sand and/or calcium carbonate;
- 0.5-5 wt. %, especially 0.75-3 wt. %, of a water soluble or water redispersible polymer, especially a copolymer based vinyl acetate and ethylene;
- 0-10, especially 0.5-5 wt. %, of one or more additives;

whereby the proportions are with respect to the weight of the mortar composition in dry state; and
(ii) mineral wool, especially stone wool;
(iii) an adhesive composition comprising or essentially consisting of:
- 25-45 wt. % of hydraulic binder, especially comprising Portland cement, and sulphoaluminate cement and optionally fly ash;
- 35-55 wt. % of rubber aggregates, especially with a particle size of 0.1-1.0 mm, preferably 0.1-0.6 mm;
- 10-25 wt. % of a water redispersible polymer, especially with a glass transition temperature of −20-0° C.;
- 0-5, especially 1-5 wt. %, of one or more additives; and wherein, preferably, a proportion of aggregates with a particle density >2,000 kg/m³ is <5 wt. % or <1 wt. %.

whereby the proportions are with respect to the weight of the adhesive composition in dry state.

Most preferred, the kit-of-parts comprises or consists of:
(i) a mortar composition comprising or essentially consisting of:
- 20-37 wt. %, of calcium aluminate cement and/or sulphoaluminate cement;
- 4-15 wt. %, especially 5-10 wt. %, Portland cement;
- optionally 0.1-10 wt. % latent hydraulic and/or pozzolanic binder materials, especially slag and/or fly ash;
- 12-22 wt. %, especially 14-20 wt. %, of lightweight aggregates comprising or consisting of expanded clay aggregates and/or hollow silicate spheres;
- 37-50 wt. %, of further aggregates comprising or consisting of sand;
- 0.75-3 wt. %, of a water soluble or water redispersible polymer, especially a copolymer based vinyl acetate and ethylene;
- 0-10, especially 0.5-5 wt. %, of one or more additives;

wherein, preferably, a weight ratio of the polymer to the hydraulic binder in the mortar composition is from 0.005-0.5, in particular, 0.01-0.3, especially, 0.01-0.2, particularly 0.015-0.1 or 0.02-0.04;

whereby the proportions are with respect to the weight of the mortar composition in dry state; and (ii) mineral wool, especially stone wool;

(iii) an adhesive composition comprising or essentially consisting of:
- 20-30 wt. % of Portland cement, especially of two different types of Portland cement;
- 3-10 wt. % of calcium sulphoaluminate cement;
- optionally 4-8 wt. % latent hydraulic and/or pozzolanic binder materials, especially slag and/or fly ash;
- 35-55 wt. % of rubber aggregates, especially with a particle size of 0.1-1.0 mm, preferably 0.1-0.6 mm;
- 3-10 wt. % of porous inorganic particles, especially with a particle size of 0.1-0.6 mm;
- 10-25 wt. % of a water redispersible polymer, especially with a glass transition temperature of −20-0° C.;
- 0-5, especially 1-5 wt. %, of one or more additives; and
wherein, preferably, a proportion of aggregates with a particle density >2,000 kg/m$^3$ is <5 wt. % or <1 wt. %;
whereby the proportions are with respect to the weight of the adhesive composition in dry state.

A further aspect of the present invention relates to a structure, in particular a floor, a wall or a ceiling, comprising:
- a substrate, in particular a floor, especially made of concrete;
- a first layer, comprising or consisting of mineral wool;
- a second layer, comprising or consisting of the mortar composition as described above, in particular in hardened state;
- optionally, a third layer, consisting or comprising of the adhesive composition as described above, in particular in hardened state;
- optionally, a cover element, in particular a tile.

Thereby, preferably, the cover element, is fixed to the second layer with the optional adhesive composition of the third layer or the cover element is directly fixed on the second layer.

In particular, for producing the structure, a mortar composition, mineral wool and optionally an adhesive composition as defined above or a kit-of-parts as described above can be used. However, it is in principle possible to use a different adhesive composition.

Especially, in the structure, a thickness of the first layer is smaller than a thickness of the second layer and/or a thickness of the third layer is smaller than a thickness of the first layer. In particular, a ratio of the thickness of the first layer to the thickness of the second layer is from 1:1-1:8, in particular 1:1.1-1:5, especially 1:1.2-1:3 or 1:1.5-1:2. Preferably, a ratio of the thickness of the third layer to the thickness of the second layer is from 1:1-1:10, in particular 1:1.5-1:7, especially 1:2-1:6 or 1:3-1:5. In particular, all of these thickness ratios are met in combination.

In particular, a thickness of the first layer is from of 3-100 mm, especially 5-50 mm, preferably 7-25 mm or 8-16 mm. Especially, a thickness of the second layer is from 4-50 mm, preferably 10-35 mm, especially 15-25 mm or 18-22 mm. Preferably, a thickness of the third layer is from 3-5 mm, especially 3.5-4.5 mm.

Optionally, it is possible to have an additional primer layer and/or intermediate layer between the substrate and the first layer, between the first and the second layer and/or between the second layer and the third layer and/or between the third layer and the cover element. This might further increase the adhesion between the substrate, the layers and/or the cover element and/or help to achieve even better noise or vibration suppression.

However, most preferred, the third layer is directly applied onto the second layer and/or the second layer is directly applied onto the first layer.

In particular, the substrate is a floor, a wall or a ceiling made essentially of mortar, concrete, bricks, plaster, metal, plastics and/or wood. Preferably, the cover element is a tile in the form of a ceramic tile, a stone and/or a veneer.

With such kind of structures, significant noise reductions can be achieved.

Another aspect of the present invention relates to a method for the production of a structure, especially with a kit-of-parts as described above, whereby:
- mineral wool as described above is placed on a substrate as a first layer;
- a mortar composition as described above is mixed with water and applied on the first layer as a second layer;
- then, optionally, an adhesive composition as described above is mixed with water and applied on the second layer as a third layer;
- optionally, a cover element, especially a tile, is furthermore placed on the third layer.

Thereby, preferably, a mineral wool with a thickness of 3-100 mm, especially 5-50 mm, preferably 7-25 mm or 8-16 mm is applied on the substrate. Then the mortar composition of the second layer is applied with a thickness from 4-50 mm, preferably 10-35 mm, especially 15-25 mm or 18-22 mm. Preferably, the adhesive composition is applied with a thickness from 3-5 mm, especially 3.5-4.5 mm.

An additional aspect of the present invention relates to the use of a mortar composition as described, optionally in combination mineral wool and/or in combination with an adhesive composition as described above, or of a kit-of-parts as described above, for fixing tiles on a substrate, in particular on a floor, a wall or a ceiling of a building or of a facility.

According to another preferred embodiment, the mortar composition as described herein, optionally in combination with mineral wool and/or in combination with an adhesive composition as defined above, or a kit-of-parts as described above, is used for acoustic damping, noise reduction and/or vibration reduction in particular on floors, walls or ceilings of buildings and/or facilities.

Further advantageous configurations of the invention are evident from the exemplary embodiments.

EXEMPLARY EMBODIMENTS

1. Mortar Compositions

Table 1 shows three mortar compositions M1-M3. The mortar compositions have been prepared by intermixing all of the components in dry state. The mortar composition M1-M3 are present as dry powders.

TABLE 1

| Mortar compositions | | | |
|---|---|---|---|
| Component | M1 | M2 | M3 |
| Hydraulic binder [wt. %] | | | |
| Portland cement (CEM I, 52.5R) | 7 | 7 | 7 |
| Calcium sulphoaluminate cement[1)] | 28 | 28 | 28 |

TABLE 1-continued

Mortar compositions

| Component | M1 | M2 | M3 |
|---|---|---|---|
| Lightweight aggregates [wt. %] | | | |
| Hollow alumina-silicate spheres[2] | 10 | 14 | 18 |
| Expanded clay[3] | 6 | 5 | 4 |
| Expanded glass[4] | — | 2 | — |
| Vermiculite[5] | 1.5 | 1.5 | 1.5 |
| Further aggregates [wt. %] | | | |
| Sand | 44.3 | 37.8 | 34.5 |
| Polymer [wt. %] | | | |
| Redispersible copolymer[6] | 1.0 | 1.5 | 3.0 |
| Additives [wt. %] | | | |
| Plasticizer[7] | 0.06 | 0.08 | 0.07 |
| Processing additives[8] | 2.14 | 3.12 | 3.93 |

[1] Alicem, available from Heidelberg Cement, Germany
[2] Fillite 500, alumina-silicate spheres with particle size 5-500 μm, available from Omya, UK
[3] Expanded clay, particle size 0-2 mm
[4] Poraver, particle size 0.5-1.0 mm, Dennert Poraver GmbH, Germany
[5] Vermiculite superfine
[6] Highly flexible dispersion powder based on vinylacetate-ethylene (Tg = −7° C.)
[7] Sika Viscocrete 125, polycarboxylate ether, Sika Germany
[8] Defoamer, rheology modifiers, thixotropic agents Mortar compositions M1-M3 have been mixed with water (for proportions see table 2) in order to obtain processable compositions. Flow table spread values were assessed similar to standard EN 12350-5:2009. Compressive strengths have been determined similar to standards EN 12390-1 to 12390-4:2000.

TABLE 2

Mortar properties

| Property | M1 | M2 | M3 |
|---|---|---|---|
| Water content[1] [wt. %] | 22 | 24 | 24 |
| Flow table spread [mm] | | | |
| After 0 minutes | 195 | 208 | 182 |
| After 30 minutes | 180 | 186 | 175 |
| Compressive strength [MPa] | | | |
| After 24 hours | 33.5 | 29.0 | 29.5 |
| After 7 days | 34.5 | 33.9 | 33.3 |
| After 28 days | 39.5 | 38.5 | 37.6 |

[1] weight ratio of water to total weight of dry mortar composition

Thus, the mortar compositions show a flow behavior which makes processing easy and allows for easy application of the mortars.

Tests with the mortar compositions similar to EN 12004-1/2:2017 revealed that properties according to criteria C1E S2 and C2E S2 are achievable.

2. Adhesive Compositions

Table 3 shows seven adhesive compositions C1-C7. The adhesive compositions have been prepared by intermixing all of the components in dry state. The adhesive composition C1-C7 are present as dry powders.

TABLE 3

Adhesive compositions

| Component | C1 | C2 | C3 | C4 | C5 | C6 | C7 |
|---|---|---|---|---|---|---|---|
| Hydraulic binder [wt. %] | | | | | | | |
| Portland cement (CEM I, 42.5N) | 20 | 25 | 25 | 30 | 20 | 20 | 35 |
| Portland cement (CEM I, 52.5N) | 10 | — | — | — | 5 | — | — |
| Calcium sulphoaluminate cement[1] | 5 | 5 | 5 | — | 5 | 10 | — |
| Fly ash | 4 | 5 | 5 | 5 | 4 | 5 | 5 |
| Slag | 2 | — | — | — | 2 | — | — |
| Lightweight aggregates [wt. %] | | | | | | | |
| Rubber[2] | 36 | — | 41 | 41 | 41 | — | — |
| Rubber[3] | — | 41 | — | — | — | 41 | 41 |
| Expanded glass[4] | 5 | 5 | 5 | 5 | 5 | 5 | 5 |
| Polymer [wt. %] | | | | | | | |
| Redispersible copolymer[5] | 15 | 16 | 16 | 16 | 15 | 17 | 12 |
| Additives [wt. %] | | | | | | | |
| Plasticizer[6] | 0.1 | 0.1 | 0.1 | 0.1 | 0.1 | 0.1 | 0.1 |
| Fibers[7] | 0.5 | — | 0.5 | 0.5 | 0.5 | — | — |
| Accelerator[8] | 1.2 | 1.2 | 1.2 | 1.2 | 1.2 | 1.2 | 1.2 |
| Layered silicate | 0.5[#] | 0.3[9] | 0.3[9] | 0.3[9] | 0.5[#] | 0.3[9] | 0.3[9] |
| Processing additives[10] | 0.7 | 1.4 | 0.9 | 0.9 | 0.7 | 0.4 | 0.4 |

[1] Alicem, available from Heidelberg Cement, Germany
[2] Genan 40 Mesh, particle size: 180-425 μm, Genan GmbH, Germany
[3] Prismatic rubber particles, particle size 0.1-0.4 mm
[4] Poraver, particle size 0.1-0.3 mm, Dennert Poraver GmbH, Germany
[5] Semi-flexible dispersion powder based on vinylacetate-ethylene-acrylicacid ester terpolymer
[6] Sika Viscocrete 125 P, polycarboxylate ether, Sika Germany
[7] Cem-Fil, type 70/30, glass fibers, 3 mm length, 20 μm diameter, Owens Corning Composite Materials LLC, USA
[8] Calcium formate and Aluminium sulphate
[9] Optibent 602, phyllosilicate, Byk-Chemie GmbH, Germany
[#] 1:1 mixture of Optibent 602 and Optibent NT10, phyllosilicates, Byk-Chemie GmbH, Germany
[10] Defoamer, rheology modifiers, thixotropic agents Adhesive compositions C1-C7 have been mixed with water (weight ratio of water to total weight of dry mortar composition=0.32-0.37) in order to obtain processable compositions.

Tests with the adhesive composition in line with EN 12004-1/2:2017 revealed that properties according to criteria C1E S2 and C2E S2 are achievable.

Internal tests similar to ISO 10140-3:2010 and ISO 717-2 showed that with covering tiles, impact noise reductions ΔLw of about up to 10 dB can be achieved with the adhesive compositions (without combination with a mortar composition).

3. Flooring Applications 3.1 Floor Structures

A first floor structure was prepared as follows: A substrate in the form of a concrete slab (according to EN 10140-3) was covered with a mat of stone wool (mineral wool) with a thickness of 12 mm. On top if this first layer of stone wool a layer of mortar composition M1 (as described above in table 1) with a thickness of 20 mm was applied (=second layer). Subsequently, this second layer was covered with a third layer consisting of adhesive composition C3 (as described above in table 3) with a thickness of 4 mm. On top of the second layer, ceramic tiles were placed.

A second floor structure was prepared similar to the first floor structure. However, in this case, the third layer (adhesive) as well as the tiles has been omitted. Thus, the second floor structure consisted only of the substrate, the first layer (stone wool) and the second layer (mortar composition).

3.2 Tests with First Floor Structure

In order to test a floor's performance, dynamic load capacity tests according to standard ASTM C627-18 (test method for evaluating ceramic floor tile installation systems with a Robinson-type floor tester) are widely accepted to test installed tile floors.

Thereby, a three-wheel cart is rotated about its center on the top of a sample section of a tile floor. Each wheel can be loaded with a predefined weight. The test comprises 14 different cycles whereby for each cycle, a type of wheel to be used (soft rubber, hard rubber, or steel), the weight to be loaded on each wheel, and the total number of revolutions to be executed is defined. From cycle 1 to cycle 14, the conditions get more and more demanding. Samples completing cycle 12 without failure are considered suitable for heavy commercial applications, such as e.g. in shopping malls, commercial kitchens, work areas, automotive service areas, and exterior decks. A floor passing cycle 14 without failure can withstand maximum dynamic loads to be expected with high-impact applications.

Dynamic load capacity tests according to the standard ASTM C627-18 with the first floor structure have shown that the floor structure can pass cycle 14 with some cracks in the tiles. However, the floor structure can be considered suitable for heavy commercial applications.

Tests according to ISO 10140-3:2010 and ISO 717-2 showed very high impact noise reductions ΔLw of 28 dB for the first floor structure.

Thus, the first floor structure features in combination a very high impact noise reduction and at the same time a very high mechanical stability.

3.3 Test with Second Floor Structure

The second floor structure (without tiles) was tested in a static load capacity test according to standard EN 1991:2010. The test was passed with a load of 600 kg. Thus, the floor structure shows a high mechanical stability.

It will be appreciated by those skilled in the art that the present invention can be embodied in other specific forms without departing from the spirit or essential characteristics thereof. The presently disclosed embodiments are therefore considered in all respects to be illustrative and not restricted.

The invention claimed is:

1. A mortar composition, comprising:
   15-40 wt. %, of calcium aluminate cement and/or sulphoaluminate cement;
   3-18 wt. %, Portland cement;
   optionally 0.1-10 wt. % latent hydraulic and/or pozzolanic binder materials, especially slag and/or fly ash;
   10-25 wt. % of lightweight aggregates, comprising porous inorganic particles and/or hollow inorganic particles;
   30-50 wt. % of further aggregates which have a particle density that is higher than the particle density of the lightweight aggregates, and which aggregates comprise quartz, sand and/or calcium carbonate;
   0.5-5 wt. % of a polymer which is a water soluble or water redispersible polymer; and
   0-10 wt. %, of one or more additives;
   whereby all amounts are with respect to the total weight of the mortar composition in dry state, and
   wherein the mortar composition comprises Portland cement and aluminate cement and/or sulphoaluminate cement with a weight ratio of Portland cement to aluminate cement and/or sulphoaluminate cement from 0.05-3.

2. The mortar composition according to claim 1, wherein a particle density of the lightweight aggregates is from 100-2,000 kg/m³.

3. The mortar composition according to claim 1, wherein the lightweight aggregates include two different types of particles, wherein a first type of particles have a particle size of 0.01-1,000 μm, and a second type of particles have a particle size of 0.01-4,000 μm.

4. The mortar composition according to claim 3, wherein a first type of particles are hollow silicate spheres and the second type of particles are expanded clay aggregates.

5. The mortar composition according to claim 4, wherein a weight ratio of the first type of particles to the second type of particles is from 1:2-10:1.

6. The mortar composition according to claim 1, wherein the polymer is a water soluble or water redispersible polymer, and/or wherein the polymer has a glass transition temperature of −45-10° C.

7. A kit-of-parts comprising:
   (i) a mortar composition according to claim 1;
   (ii) optionally mineral wool, slag wool and/or glass wool;
   (iii) optionally, an adhesive composition, whereby the adhesive composition comprises:
      a) 10-50 wt. % of a hydraulic binder,
      b) 20-60 wt. % of lightweight aggregates,
      c) 10-25 wt. % of a polymer;
   and whereby the adhesive composition is chemically different from the mortar composition;
   whereby, in addition to the mortar composition, the kit-of-parts comprises either mineral wool, or the adhesive composition, or both.

8. The kit-of-parts according to claim 7, whereby the mineral wool is present in the form of a flat plate or mat.

9. A structure, a wall or a ceiling, comprising:
   a substrate;
   a first layer, comprising mineral wool;
   a second layer, comprising the mortar composition according to claim 1 in hardened state;
   optionally, a third layer, comprising an adhesive in hardened state, the adhesive composition comprising:

a) 10-50 wt. % of a hydraulic binder,
b) 20-60 wt. % of lightweight aggregates,
c) 10-25 wt. % of a polymer;
optionally, a cover element.

10. The structure according to claim 9, whereby a thickness of the first layer is smaller than a thickness of the second layer and/or whereby a thickness of the third layer is smaller than a thickness of the first layer.

* * * * *